Sept. 11, 1951     S. RUHLAND     2,567,653
PENDULUM INCLINOMETER
Filed Jan. 29, 1948
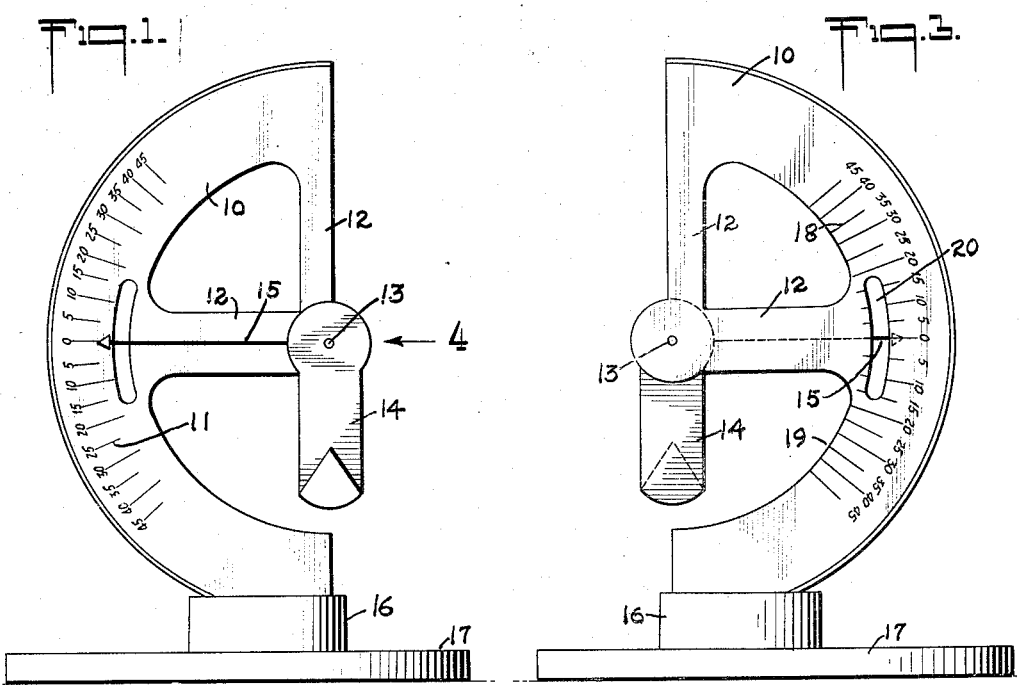
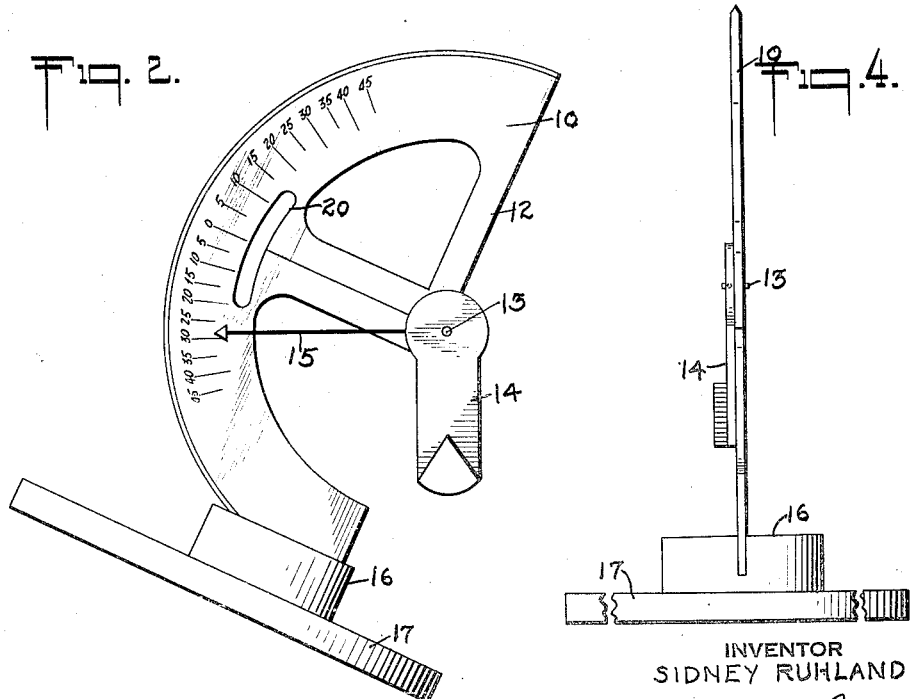
INVENTOR
SIDNEY RUHLAND
BY
ATTORNEY Patented Sept. 11, 1951

2,567,653

UNITED STATES PATENT OFFICE 2,567,653

PENDULUM INCLINOMETER

Sidney Ruhland, New York, N. Y.

Application January 29, 1948, Serial No. 5,031

2 Claims. (Cl. 33—215)

This invention relates to inclinometers of the pendulum type which can be easily read.

It is an object of this invention to provide a new and improved device which may be applied to the dashboard of an automobile in a position to be within the range of ready vision of the driver, which will indicate the degree of elevation or depression of the road while driving.

It is a further object of this invention to provide an instrument which will also be suitable for use by members of the construction trades, such as carpenters, plumbers, masons, bricklayers and electricians, to give not only an indication of level, but which also, if a device be at an angle, will show at once the angle of inclination.

It is a further object to provide a device which will not only be accurate in its readings, but which also will be inexpensive to manufacture, so that it may be given away as an advertising gift.

It is a further object to provide a device which, if it be desired to use it to measure repeatedly devices having the same angle to the horizontal, may be adjusted once for all to the selected angles and thereafter give a zero reading at that point, or which can be installed on an instrument board of any inclination and adjusted to a zero reading on level ground, regardless of the inclination of the board.

The invention accordingly comprises a device possessing the features, properties and the relation of elements which will be exemplified in the device hereinafter described and the scope of the application of which will be indicated in the claims.

For a fuller understanding of the nature and objects of the invention, reference should be had to the following detailed description taken in connection with the accompanying drawings, in which:

Fig. 1 is a front elevation of a device embodying this invention. Fig. 2 is a front elevation of the device at an angle to the horizontal. Fig. 3 is a rear elevation corresponding to Fig. 1. Fig. 4 is a side elevation of the same.

The device consists essentially of a graduated annular strip 10 comprising a part circle such as a semi-circle preferably of plastic, graduated in degrees, or in any other convenient manner, as shown at 11, having a zero in the center as shown.

This strip has radial arms 12 which support, at the center of the circle, a pivot 13, which supports a freely swinging pendulum 14. The pendulum 14 carries an indicating arm 15 playing over the graduations 11.

The strip 10 is carried within a slot in a support 16, which may be made of wood or cork, which in turn may be cemented to a flat base 17 as shown or to the instrument board or other suitable portion of a car.

The device may be readily adjusted to any specified use, by laying the base on any flat surface which is level or which has the required angle, and then cementing the scale in the slot in the support in such position as to read zero. Or if the device is to be attached in a car, the base will be attached and the car be brought onto level ground. Thereupon, the scale will be cemented in place with the scale reading zero.

In many cases it will be desirable to provide an instrument which can be read from either side. For this purpose I prefer to provide graduations 11a on the reverse side also, as shown at 18, which extend inwardly to the inner diameter 19 of the annular strip, so as to be readily comparable with the position of the indicator. Since it is desirable, however, to provide at least one of the arms 12 within that portion of the scale which carries the useful portion of the graduations, I provide a window 20 in the plastic opposite the end of this arm 12, which window is also adjacent to graduations 18. This window is so placed as to permit the indicator to be seen at all times from the reverse side, either directly inside the smaller circle of the annulus or through the window, and in either position its position upon the scale can be easily read.

I am aware that inclinometers have been constructed upon the pendulum principle, but such devices have been expensive and cumbersome. On this account also they are unsuitable for advertising use.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

I claim:

1. An advertising novelty comprising an arcuate disc having graduations around its periphery, an arm extending inward to the center from said disc to support a central pivot, a pendulum supported on said pivot carrying a pointer extending to said scale, and a support member adapted to be attached to a base and having a slot in which said disc may be glued, said scale having graduations on both sides thereof and said scale having a window through it extending in a circumferential direction by an amount greater than the circumferential width of said arm.

2. An advertising novelty comprising a flat arcuate plate having radial graduations around its periphery and an arm extending inwardly towards the center of the arc to support the central pivot, a pendulum pivoted upon this pivot, a pointer extending from said pendulum to said scale, a base having a slot therein and means for fastening said plate in said slot at any position, said plate having graduations on both sides thereof, said plate having a window therethrough of greater circumferential length than the angular width of said pointer, whereby said pointer may be read from both sides of said plate.

SIDNEY RUHLAND.

REFERENCES CITED

The following references are of record in the file of this patent:

UNITED STATES PATENTS

| Number | Name | Date |
|---|---|---|
| 567,347 | Kelly | Sept. 8, 1896 |
| 834,765 | Sechler | Oct. 30, 1906 |
| 937,633 | Neidl | Oct. 19, 1909 |
| 1,175,307 | Schroeder | Mar. 14, 1916 |
| 1,308,795 | McCormack | July 8, 1917 |
| 1,346,547 | Lackland | July 13, 1920 |
| 1,691,632 | Bartow | Nov. 13, 1928 |
| 2,183,765 | Coleman | Dec. 19, 1939 |